US012688652B2

(12) United States Patent
Rodriguez et al.

(10) Patent No.: US 12,688,652 B2
(45) Date of Patent: Jul. 21, 2026

(54) SURFACE MESH SELF-INTERSECTION DETECTION

(71) Applicant: Autodesk, Inc., San Francisco, CA (US)

(72) Inventors: Jesus Rodriguez, Farmington, MI (US); Siavash Navadeh Meshkat, Carlsbad, CA (US)

(73) Assignee: Autodesk, Inc., San Francisco, CA (US)

( * ) Notice: Subject to any disclaimer, the term of this patent is extended or adjusted under 35 U.S.C. 154(b) by 229 days.

(21) Appl. No.: 18/440,851

(22) Filed: Feb. 13, 2024

(65) Prior Publication Data

US 2025/0259395 A1 Aug. 14, 2025

(51) Int. Cl.
*G06T 17/20* (2006.01)
*G06T 7/13* (2017.01)
*G06T 7/60* (2017.01)
*G06T 13/20* (2011.01)

(52) U.S. Cl.
CPC .............. *G06T 17/205* (2013.01); *G06T 7/13* (2017.01); *G06T 7/60* (2013.01); *G06T 13/20* (2013.01); *G06T 2210/21* (2013.01)

(58) Field of Classification Search
CPC  G06T 17/205; G06T 7/13; G06T 7/60; G06T 13/20; G06T 2210/21; G06F 30/23
See application file for complete search history.

(56) References Cited

U.S. PATENT DOCUMENTS

| | | | | |
|---|---|---|---|---|
| 2021/0335038 A1* | 10/2021 | Zhang | ................... | G06T 17/205 |
| 2025/0029335 A1* | 1/2025 | Kim | ...................... | G06T 17/205 |
| 2025/0037397 A1* | 1/2025 | Wu | ......................... | G06T 15/06 |

OTHER PUBLICATIONS

Doc.cgal.org [online], "CGAL 5.6—3D Fast Intersection and Distance Computation (AABB Tree): AABB Tree Reference," available on or before Jul. 2020, retrieved on Nov. 2023, retrieved from URL<https://doc.cgal.org/latest/AABB_tree/group_PkgAABBTreeRef.html>, 2 pages.
Doc.cgal.org [online], "CGAL 5.6—3D Fast Intersection and Distance Computation (AABB Tree): User Manual," available on or before Nov. 2013, retrieved on Nov. 2023, retrieved from URL<https://doc.cgal.org/latest/AABB_tree/index.html#Chapter_3D_Fast_Intersection_and_Distance_Computation>, 12 pages.

(Continued)

*Primary Examiner* — Haixia Du
(74) *Attorney, Agent, or Firm* — Fish & Richardson P.C.

(57) ABSTRACT

Methods, systems, and apparatus, including medium-encoded computer program products, for detecting self-intersections of a surface mesh, include: obtaining (i) a surface mesh including vertices and edges that define triangles that approximate a surface of a three-dimensional model of a three-dimensional object, and (ii) a Delaunay diagram of the vertices of the surface mesh, wherein the Delaunay diagram includes a volumetric mesh including tetrahedrons having vertices at the vertices of the surface mesh; determining, using the Delaunay diagram, data indicating at least one intersection among the triangles of the surface mesh; and causing a refinement of the surface mesh based on the data indicating the at least one intersection, wherein the refinement removes the at least one intersection among the triangles of the surface mesh.

20 Claims, 6 Drawing Sheets

(56) References Cited

OTHER PUBLICATIONS

Edelsbrunner, "Triangulations and meshes in computational geometry," Acta. Numerica., Jan. 2000, 9:133-213.

Shephard et al., "Automatic three-dimensional mesh generation by the finite octree technique," International Journal of Numerical Methods in Engineering, Sep. 1991, 32(4):709-749.

Shewchuk, "Tetrahedral Mesh Generation by Delaunay Refinement," SCG '98: Proceedings of the Fourteenth Annual Symposium on Computational Geometry, Jun. 1998, 10 pages.

Yang et al., "An algorithm for tetrahedral mesh generation based on conforming constrained Delaunay tetrahedralization," Computers and Graphics, Aug. 2005, 29(4):606-615.

* cited by examiner

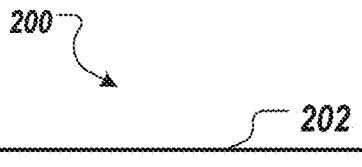

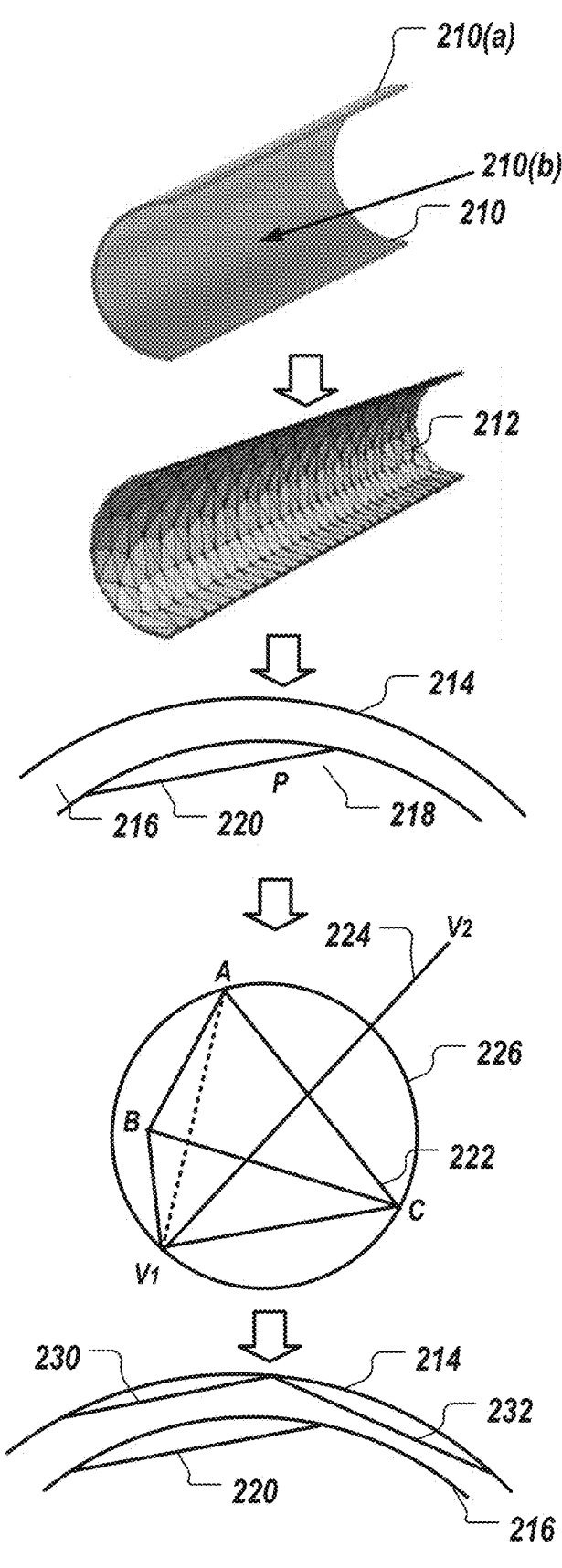

202

Obtain a surface mesh including vertices and edges that define triangles that approximate a surface of a three-dimensional model of a three-dimensional object

204

Obtain a Delaunay diagram of the vertices of the surface mesh, wherein the Delaunay diagram includes a volumetric mesh including tetrahedrons having vertices at the vertices of the surface mesh

206

Determine, using the Delaunay diagram, data indicating at least one intersection among the triangles of the surface mesh

208

Cause a refinement of the surface mesh based on the data indicating the at least one intersection, e.g., removing the at least one intersection among the triangles of the surface mesh by generating an updated surface mesh

*FIG. 2*

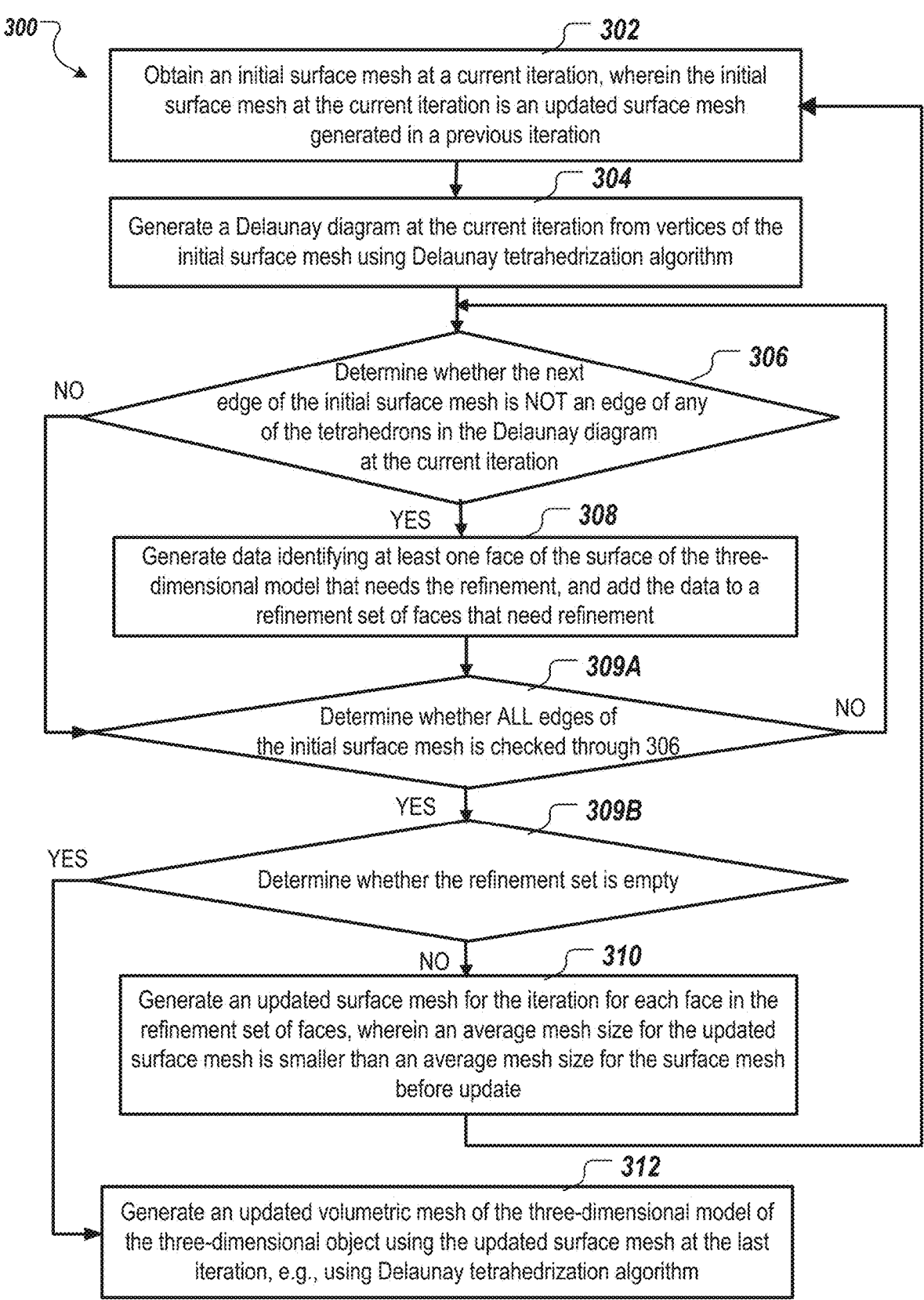

*300*

302

Obtain an initial surface mesh at a current iteration, wherein the initial surface mesh at the current iteration is an updated surface mesh generated in a previous iteration

304

Generate a Delaunay diagram at the current iteration from vertices of the initial surface mesh using Delaunay tetrahedrization algorithm

306

Determine whether the next edge of the initial surface mesh is NOT an edge of any of the tetrahedrons in the Delaunay diagram at the current iteration

NO

YES

308

Generate data identifying at least one face of the surface of the three-dimensional model that needs the refinement, and add the data to a refinement set of faces that need refinement

309A

Determine whether ALL edges of the initial surface mesh is checked through 306

NO

YES

309B

Determine whether the refinement set is empty

YES

NO

310

Generate an updated surface mesh for the iteration for each face in the refinement set of faces, wherein an average mesh size for the updated surface mesh is smaller than an average mesh size for the surface mesh before update

312

Generate an updated volumetric mesh of the three-dimensional model of the three-dimensional object using the updated surface mesh at the last iteration, e.g., using Delaunay tetrahedrization algorithm

*FIG. 3*

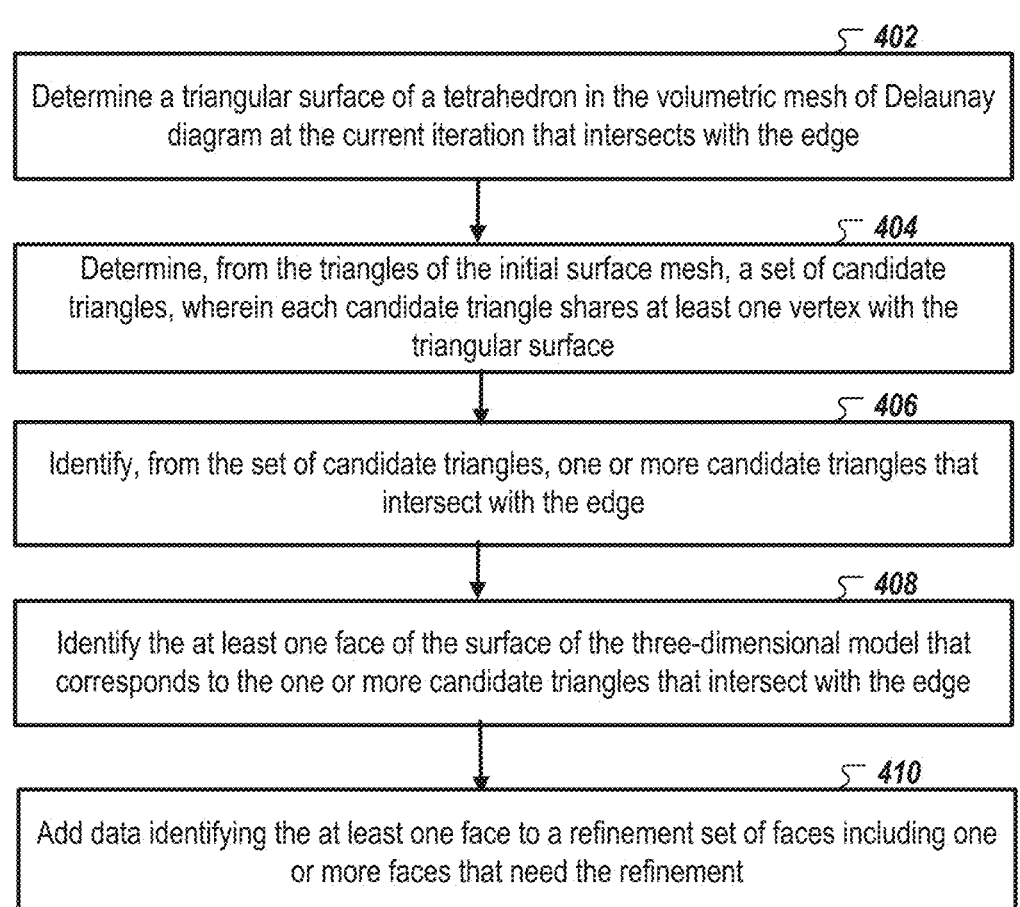

*402*

Determine a triangular surface of a tetrahedron in the volumetric mesh of Delaunay diagram at the current iteration that intersects with the edge

*404*

Determine, from the triangles of the initial surface mesh, a set of candidate triangles, wherein each candidate triangle shares at least one vertex with the triangular surface

*406*

Identify, from the set of candidate triangles, one or more candidate triangles that intersect with the edge

*408*

Identify the at least one face of the surface of the three-dimensional model that corresponds to the one or more candidate triangles that intersect with the edge

*410*

Add data identifying the at least one face to a refinement set of faces including one or more faces that need the refinement

*FIG. 4*

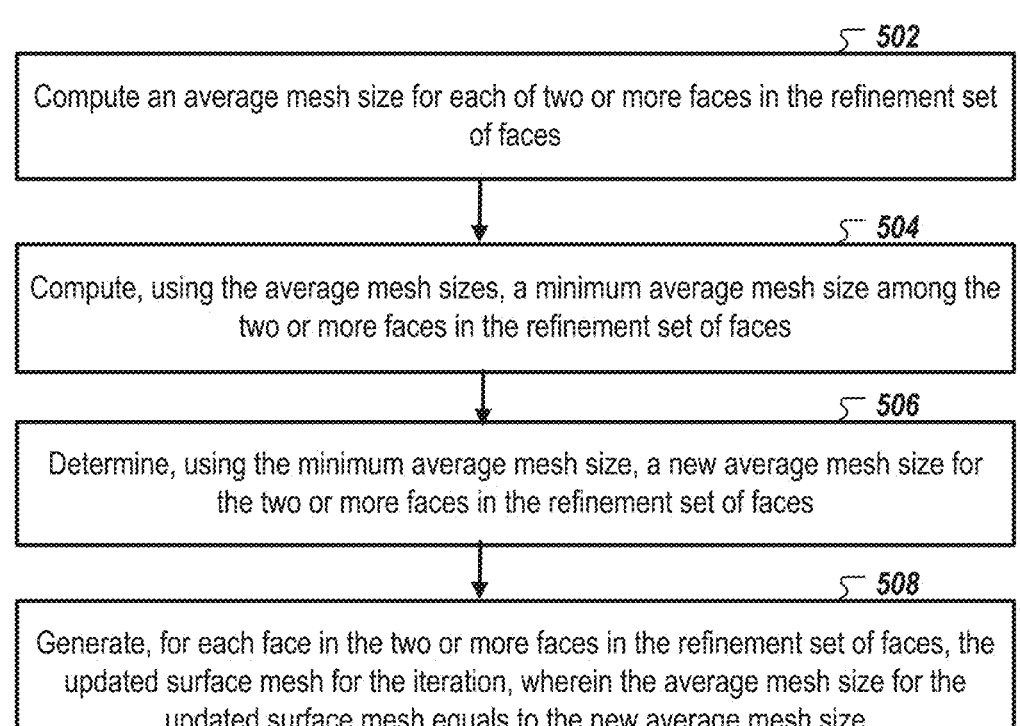

502
Compute an average mesh size for each of two or more faces in the refinement set of faces 504
Compute, using the average mesh sizes, a minimum average mesh size among the two or more faces in the refinement set of faces 506
Determine, using the minimum average mesh size, a new average mesh size for the two or more faces in the refinement set of faces 508
Generate, for each face in the two or more faces in the refinement set of faces, the updated surface mesh for the iteration, wherein the average mesh size for the updated surface mesh equals to the new average mesh size

*FIG. 5*

SURFACE MESH SELF-INTERSECTION DETECTION

BACKGROUND

This specification relates to three-dimensional modeling in computer graphics applications, such as rendering for computer generated animation or numerical simulations for computer aided design of virtual objects and/or physical structures to be manufactured.

Computer Aided Design (CAD) software has been developed and used to generate 3D representations of objects, and Computer Aided Manufacturing (CAM) software has been developed and used to manufacture the physical structure of those objects, e.g., using Computer Numerical Control (CNC) manufacturing techniques. The CAD software has also included software tools that can be used to redesign and enhance 3D parts of the objects. The CAD software has been used in conjunction with additive manufacturing systems and techniques and subtractive manufacturing systems and techniques.

Additive manufacturing, also known as solid free form fabrication or 3D printing, refers to any manufacturing process where 3D objects are built up from raw material in a series of layers or cross-sections. Examples of additive manufacturing include Fused Filament Fabrication (FFF), Selective Laser Sintering (SLS), and Direct Metal Laser Sintering (DMLS).

Subtractive manufacturing refers to any manufacturing process where 3D objects are created from stock material (generally a "blank" or "workpiece" that is larger than the 3D object) by cutting away portions of the stock material. Such subtractive manufacturing processes typically involve the use of multiple CNC machine cutting tools in a series of operations, starting with a roughing operation, an optional semi-finishing operation, and a finishing operation.

A numerical simulation generates predicted behavior of an object (e.g., a part, an assembly, or a structure) using a model of the object, such as geometry, boundary conditions, and materials of the object. Numerical simulations are useful to predict the behavior of an object whose mathematical models can be too complex to provide analytical solutions. For example, a numerical simulation program can predict displacements or stresses of an assembly.

Some numerical simulation techniques or rendering techniques are based on a volumetric mesh of the 3D object. For example, Finite Element Analysis (FEA) is one of the numerical simulation techniques to predict the behavior of a three-dimensional (3D) object based on a volumetric mesh of the 3D object. A volumetric mesh of a 3D object includes a set of 3D elements, such as hexahedrons or tetrahedrons, that represent the structure of the 3D model of the 3D object. The quality of the volumetric mesh can influence the accuracy and efficiency of the numerical simulation. One of the first steps in generating a volumetric mesh of a 3D object is the generation of a surface mesh. A surface mesh includes vertices and edges that define 2D elements, such as triangles, that approximate a surface of the 3D model of the 3D object.

Some surface meshes may have a self-intersection among the 2D elements of the surface mesh. For example, a triangle of one face of the 3D model may intersect with another triangle of another face of a 3D model. Self-intersections in the surface mesh can arise due to insufficient discretization of features in the 3D model. Self-intersections in a surface mesh can result in failure of generating a volumetric mesh of a 3D object and/or of generating a correct result for downstream processing, such as numerical simulations.

Although self-intersections can be resolved by increasing the discretization in the problematic areas of the surface mesh, detecting self-intersections in a surface mesh can be computationally expensive and time-consuming.

SUMMARY

This specification relates to efficiently detecting self-intersections of a surface mesh of a three-dimensional (3D) model of a 3D object using a Delaunay diagram. The 3D model of a 3D object can be of one or more physical structures designed for manufacture using additive manufacturing, subtractive manufacturing and/or a combination of these and optionally other manufacturing systems and techniques. Moreover, the systems and techniques described can also be implemented in animation production programs that render 3D models of the objects to an appropriate format for visual display, such as by a digital projector. Other applications are also possible.

In general, one or more aspects of the subject matter described in this specification can be embodied in one or more methods (and also one or more non-transitory computer-readable mediums tangibly encoding a computer program operable to cause data processing apparatus to perform operations) including: obtaining (i) a surface mesh including vertices and edges that define triangles that approximate a surface of a three-dimensional model of a three-dimensional object, and (ii) a Delaunay diagram of the vertices of the surface mesh, wherein the Delaunay diagram includes a volumetric mesh including tetrahedrons having vertices at the vertices of the surface mesh; determining, using the Delaunay diagram, data indicating at least one intersection among the triangles of the surface mesh; and causing a refinement of the surface mesh based on the data indicating the at least one intersection, wherein the refinement removes the at least one intersection among the triangles of the surface mesh.

The method (or operations performed by the data processing apparatus in accordance with the computer program tangibly encoded in one or more non-transitory computer-readable mediums) can include: the obtaining can include generating the surface mesh from the three-dimensional model of the three-dimensional object. The obtaining can include generating the Delaunay diagram from the vertices of the surface mesh using Delaunay tetrahedrization algorithm. Determining, using the Delaunay diagram, the data indicating the at least one intersection among the triangles of the surface mesh can include: for each edge of the edges of the surface mesh, determining whether the edge is not an edge of any of the tetrahedrons in the Delaunay diagram; and in response to determining that the edge is not in the Delaunay diagram, determining at least one triangle among the triangles of the surface mesh that intersects with the edge. The surface of the three-dimensional model can include faces, wherein the data indicating the at least one intersection among the triangles of the surface mesh can include data identifying at least one face of the surface of the three-dimensional model that corresponds to the at least one triangle that intersects with the edge. Determining the at least one triangle among the triangles of the surface mesh that intersects with the edge can include: determining a triangular surface of a tetrahedron in the volumetric mesh of the Delaunay diagram that intersects with the edge; determining, from the triangles of the surface mesh, a set of candidate triangles, wherein each candidate triangle shares at least one vertex with the triangular surface; and determining, from the set of candidate triangles, the at least one triangle that intersects with the edge.

The causing can include: removing the at least one intersection among the triangles of the surface mesh by generating an updated surface mesh, including: generating, a respective updated portion of the updated surface mesh for each face of the surface of the three-dimensional model where the at least one intersection among the triangles of the surface mesh is located, wherein an average mesh size for each updated portion of the updated surface mesh can be smaller than an average mesh size for the portion of the surface mesh before the update. The method (or operations performed by the data processing apparatus in accordance with the computer program tangibly encoded in one or more non-transitory computer-readable mediums) can include: generating an updated volumetric mesh of the three-dimensional model of the three-dimensional object using the updated surface mesh. The method (or operations performed by the data processing apparatus in accordance with the computer program tangibly encoded in one or more non-transitory computer-readable mediums) can include: providing the updated volumetric mesh of the three-dimensional model for numerical simulation of the three-dimensional object. Generating the updated volumetric mesh can include generating an updated Delaunay diagram from vertices of the updated surface mesh using Delaunay tetrahedrization algorithm, wherein the updated Delaunay diagram can include the updated volumetric mesh. The method (or operations performed by the data processing apparatus in accordance with the computer program tangibly encoded in one or more non-transitory computer-readable mediums) can include: rendering the updated surface mesh and/or an updated volumetric mesh of the three-dimensional model of the three-dimensional object generated using the updated surface mesh to an animation document for a digital projector.

The method (or operations performed by the data processing apparatus in accordance with the computer program tangibly encoded in one or more non-transitory computer-readable mediums) can include: iteratively generating the refinement of the surface mesh, wherein the iteratively generating can include, for each iteration: obtaining an initial surface mesh at a current iteration, wherein the initial surface mesh at the current iteration can be an updated surface mesh generated in a previous iteration; generating a Delaunay diagram at the current iteration from vertices of the initial surface mesh using Delaunay tetrahedrization algorithm; for each edge of the edges of the initial surface mesh, determining whether the edge is not an edge of any of the tetrahedrons in the Delaunay diagram at the current iteration; in response to determining that the edge is not in the Delaunay diagram at the current iteration, generating data identifying at least one face of the surface of the three-dimensional model that needs the refinement, wherein the generating can include: determining a triangular surface of a tetrahedron in the volumetric mesh of Delaunay diagram at the current iteration that intersects with the edge; determining, from the triangles of the initial surface mesh, a set of candidate triangles, wherein each candidate triangle shares at least one vertex with the triangular surface; identifying, from the set of candidate triangles, one or more candidate triangles that intersect with the edge; identifying the at least one face of the surface of the three-dimensional model that corresponds to the one or more candidate triangles that intersect with the edge; and adding data identifying the at least one face to a refinement set of faces including one or more faces that need the refinement; and generating an updated surface mesh for the iteration for each face in the refinement set of faces, wherein an average mesh size for the updated surface mesh can be smaller than an average mesh size for the surface mesh before update.

The iteratively generating can include, for a last iteration: for each edge of edges of a second initial surface mesh at a current iteration, determining whether the edge is not an edge of any of the tetrahedrons in a Delaunay diagram at the current iteration; and in response to determining that each edge of the second initial surface mesh is an edge of a tetrahedron in the Delaunay diagram at the current iteration, determining that the second initial surface mesh is a final updated surface mesh. Generating the updated surface mesh for the iteration for each face in the refinement set of faces can include: computing an average mesh size for each of two or more faces in the refinement set of faces; computing, using the average mesh sizes, a minimum average mesh size among the two or more faces in the refinement set of faces; determining, using the minimum average mesh size, a new average mesh size for the two or more faces in the refinement set of faces; and generating, for each face in the two or more faces in the refinement set of faces, the updated surface mesh for the iteration, wherein the average mesh size for the updated surface mesh equals to the new average mesh size.

One or more aspects of the subject matter described in this specification can also be embodied in one or more systems including: a non-transitory storage medium having instructions of a three-dimensional modeling program stored thereon; and one or more data processing apparatus configured to run the instructions of the three-dimensional modeling program to perform operations specified by the instructions of the three-dimensional modeling program; wherein the operations include: obtaining (i) a surface mesh including vertices and edges that define triangles that approximate a surface of a three-dimensional model of a three-dimensional object, and (ii) a Delaunay diagram of the vertices of the surface mesh, wherein the Delaunay diagram includes a volumetric mesh including tetrahedrons having vertices at the vertices of the surface mesh; determining, using the Delaunay diagram, data indicating at least one intersection among the triangles of the surface mesh; and causing a refinement of the surface mesh based on the data indicating the at least one intersection, wherein the refinement removes the at least one intersection among the triangles of the surface mesh.

Particular embodiments of the subject matter described in this specification can be implemented to realize one or more of the following advantages.

Compared with existing self-intersection detection techniques, the systems and techniques described herein can efficiently detect self-intersections of a surface mesh of a three-dimensional (3D) model of a 3D object using a Delaunay diagram because the Delaunay diagram can provide closeness information between the vertices of the surface mesh. Some existing techniques can detect self-intersections of a surface mesh using a brute force method, e.g., by determining whether there is an intersection between each pair of triangles in the surface mesh. Because a surface mesh can have hundreds or thousands of triangles, these techniques can be very slow. For example, if a surface mesh has N triangles, these techniques can require intersection analysis for N times N triangle-triangle pair (or triangle-edge pair). Compared with detecting self-intersection using a brute force comparison of each pair of triangles in a surface mesh, the systems and techniques described herein can significantly reduce the amount of computation required.

Some existing techniques that detect self-intersection of a surface mesh can rule out pairs of triangles that do not have close spatial relationship through spatial decomposition of the 3D space. These techniques can use a tree-based algorithm, e.g., an Octree or K-d-tree algorithm, to divide the 3D space into a tree of spatial components. These techniques can reduce computation by only performing self-intersection detection between the triangles in each spatial component. However, the number of triangles in each spatial component may not have an equal distribution. Thus, these techniques may need to recursively divide the 3D space into smaller components, which can be computationally expensive. Further, these techniques can be coordinate dependent. The quality of the self-intersection detection may depend on a chosen coordinate system of the tree-based algorithm. A change of the coordinate system may result in different spatial decompositions, which may lead to a different sequence of operations to detect the self-intersection. Moreover, these techniques can be shape dependent. The efficiency of the self-intersection detection may depend on the structure of the 3D model. For example, these techniques may work better for straight surfaces than curved surfaces. Compared with tree-based spatial decomposition techniques, because a Delaunay diagram is coordinate invariant and is structure invariant, the systems and techniques described herein can efficiently generate self-intersection detection result and the quality of the self-intersection detection is not dependent on the chosen coordinate system of the spatial decomposition and is also not dependent on the structure of the 3D object.

The systems and techniques described herein can reduce the overall simulation runtime by speeding up a volume meshing step that generates a volumetric mesh of a 3D object. Some existing techniques can determine the existence of self-intersection issues only after receiving an error during the volume meshing step. These techniques generate a volumetric mesh from a surface mesh without checking whether the surface mesh has self-intersection(s). After performing computation on the volumetric mesh, these techniques can determine an error, e.g., a non-converging calculation or a value that is outside a predetermined range. These techniques can perform root cause analysis and can determine that a self-intersection in the surface mesh causes the error. These techniques may have to terminate the volume meshing computation, regenerate the surface-mesh to remove the self-intersection, regenerate a volumetric mesh, and then perform a numerical simulation based on the regenerated volumetric mesh, thus wasting lots of computational resources. By performing self-intersection detection before generating a volumetric mesh, the systems and techniques described herein can avoid the wasted computational resources for situations of having to regenerate a volumetric mesh after an error due to the existence of self-intersection has occurred.

For objects with thin structures, the systems and techniques described herein can significantly reduce computation time and reduce the amount of computational resources needed to compute a surface mesh of the thin structures. Because self-intersections often exist in a surface mesh for a thin structure, some existing techniques may not be able to efficiently and/or correctly detect self-intersections in the surface mesh of the thin structure, resulting in inefficient and/or incorrect downstream processing. The systems and techniques can solve this problem by efficiently and correctly detecting the self-intersections in a surface mesh of a thin structure using properties of a Delaunay diagram. Thus, compared with some existing techniques, the systems and techniques described herein can result in less computational cost and improve user experience of users who perform the downstream processing, such as a numerical simulation and/or a rendering of a volumetric mesh generated based on the surface mesh.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 2 is a flowchart showing an example of a process to detect self-intersection in a surface mesh of a three-dimensional model.

FIG. 3 is a flowchart showing an example of a process to detect self-intersection in a surface mesh of a three-dimensional model and refine the surface mesh using an iterative algorithm.

FIG. 4 is a flowchart showing an example of a process to generate data identifying a face of a three-dimensional model that has self-intersection.

FIG. 5 is a flowchart showing an example of a process to remove self-intersection for a face of a three-dimensional model.

Like reference numbers and designations in the various drawings indicate like elements.

DETAILED DESCRIPTION

Figure 1:
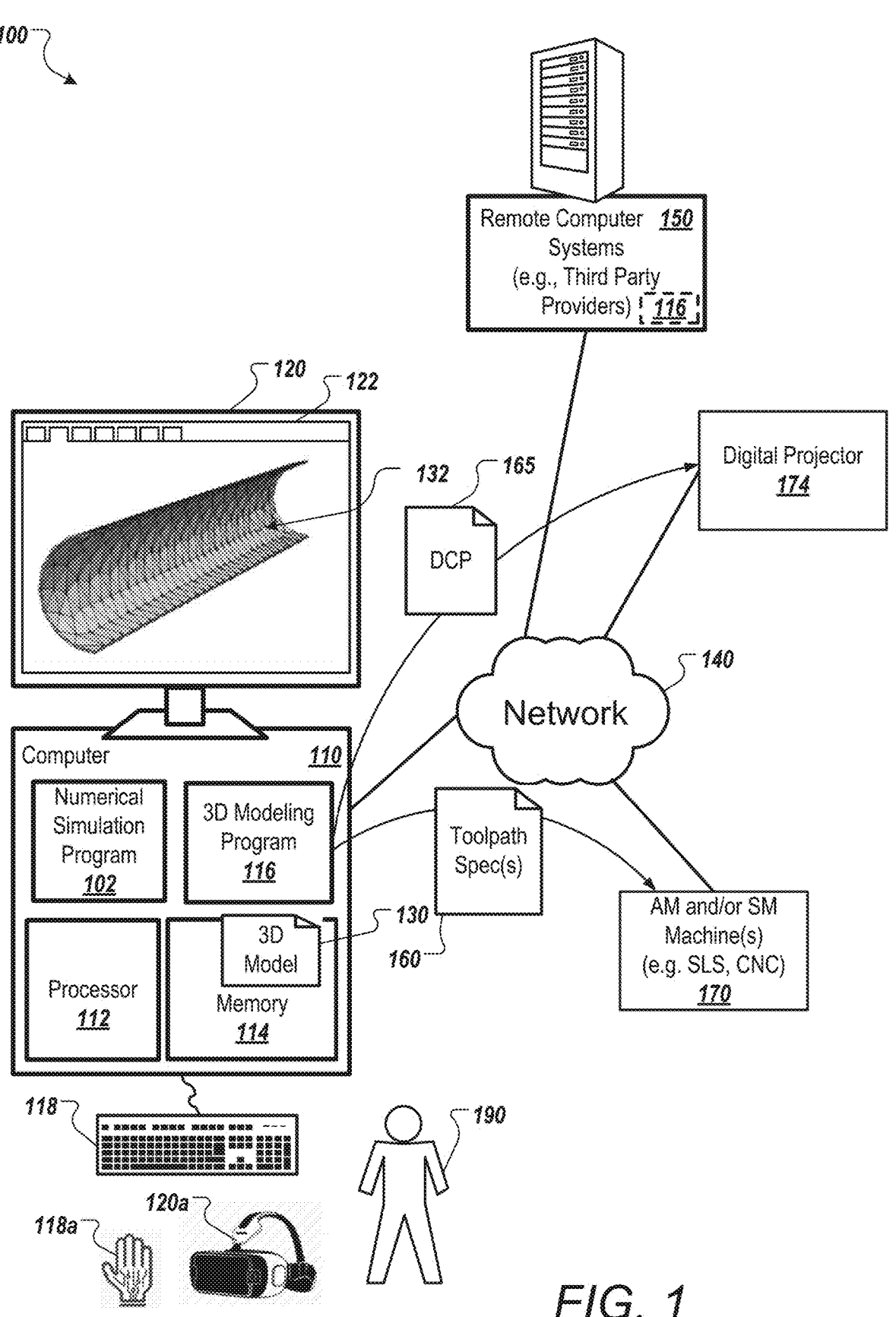
FIG. 1 shows an example of a system usable to perform numerical simulations and/or generate computer animation using three-dimensional models.

FIG. 1 shows an example of a system 100 usable to perform numerical simulations and/or generate computer animation using three-dimensional models. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including a three-dimensional (3D) modeling program 116, which implement 3D modeling functions, including detecting self-intersection in a surface mesh and generating a volumetric mesh of a 3D model 130 of an object. The object can be a physical object, e.g., a physical part to be manufactured, or a virtual object, e.g., an object in a computer game.

In some implementations, the 3D modeling program 116 can be Computer Aided Design (CAD) program(s). As used herein, CAD program(s) refers to any suitable program used to design physical structures that meet specified design requirements, regardless of whether or not the program is capable of interfacing with and/or controlling specific manufacturing equipment. Thus, 3D modeling program 116 can include Computer Aided Industrial Design (CAID) program (s), Computer Aided Engineering (CAE) program(s), Computer Aided Manufacturing (CAM) program(s), etc. In some implementations, the 3D modeling program 116 can be computer programs for computer animation, such as graphics programs, collision detection programs, and rendering programs for display of scenes.

The 3D modeling program 116 can run locally on computer 110, remotely on a computer of one or more remote computer systems 150 (e.g., one or more third party providers' one or more server systems accessible by the computer 110 via the network 140) or both locally and remotely. Thus, the 3D modeling program 116 can be two or more programs that operate cooperatively on two or more separate computer processors in that a program operating locally at computer 110 can offload processing operations "to the cloud" by having one or more programs on one or more remote computer systems 150 perform the offloaded processing operations.

The 3D modeling program 116 presents a user interface (UI) 122 on a display device 120 of the computer 110, which can be operated using one or more input/output devices 118 of the computer 110 (e.g., keyboard and mouse). Note that while shown as separate devices in FIG. 1, the display device 120 and/or input/output devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a.

As noted above, the 3D modeling program 116 implements 3D modeling functions, and a volumetric mesh can be generated using the 3D modeling program 116. A volumetric mesh of a 3D object includes a set of 3D elements, such as a set of tetrahedrons, that represents the structure of the 3D model of the 3D object. A quality of the volumetric mesh can influence the accuracy and efficiency of a numerical simulation of the 3D model using the volumetric mesh.

One of the first steps of generating a volumetric mesh of a 3D model is generating a surface mesh 132 of the 3D model 130. A surface mesh 132 includes vertices and edges that define 2D elements, such as triangles, that approximate a surface of the 3D model of the 3D object. The surface mesh 132 can define the boundary of the 3D model and can ensure that 3D elements of a volumetric mesh generated from the surface mesh 132 is within the boundaries of the 3D model 130. In some implementations, the 3D modeling program 116 can generate a surface mesh from a 3D model of a 3D object. In some implementations, the 3D modeling program 116 can receive a surface mesh generated by another computer program at the computer 110 or at a remote computer.

Some surface meshes (not shown in FIG. 1) may have a self-intersection among the 2D elements of the surface mesh, e.g., the triangles of the surface mesh. For example, an edge of a triangle of one face of a 3D model may intersect with another triangle of another face of the 3D model. Self-intersections in the surface mesh can arise due to insufficient discretization of features in the 3D model. Self-intersections in a surface mesh can result in failure of generating a volumetric mesh and/or a numerical simulation of a 3D object. Although self-intersections can be resolved by increasing the discretization in the problematic areas of the surface mesh, detecting self-intersections in a surface mesh can be computationally expensive and time-consuming.

The 3D modeling program 116 can obtain a Delaunay diagram of the vertices of a surface mesh and can efficiently determine data indicating at least one intersection among triangles of the surface mesh using the Delaunay diagram. A Delaunay diagram, also known as a Delaunay tetrahedrization or a Delaunay tetrahedralization, of a given set of discrete points in a 3D space includes a volumetric mesh, and the volumetric mesh includes tetrahedrons having vertices at the set of discrete points. A Delaunay diagram requires that no point is inside the circumscribing sphere of any tetrahedron in the Delaunay diagram. Thus, a Delaunay diagram has desirable properties such as its tendency to favor fat tetrahedrons over skinny tetrahedrons and is often used to generate a volumetric mesh of a 3D model of a 3D object.

The Delaunay diagram of a surface mesh includes a volumetric mesh including tetrahedrons having vertices at the vertices of triangles included in the surface mesh. In some implementations, the 3D modeling program 116 can generate the Delaunay diagram from vertices of a surface mesh using Delaunay tetrahedrization algorithm. In some implementations, the 3D modeling program 116 can obtain the Delaunay diagram generated by another computer program at the computer 110 or at a remote computer. Because Delaunay diagrams can provide closeness information between the vertices of a surface mesh, the 3D modeling program 116 can efficiently detect self-intersection of a surface mesh.

In particular, for each edge of the edges of the surface mesh, the 3D modeling program 116 can determine whether the edge is not an edge of any of the tetrahedrons in the Delaunay diagram. Because a Delaunay diagram requires that no point is inside the circumscribing sphere of any tetrahedron in the Delaunay diagram, finding an edge that is not an edge of any of the tetrahedrons in the Delaunay diagram indicates that there is self-intersection(s). If the 3D modeling program 116 determines that an edge is not an edge of any of the tetrahedrons in the Delaunay diagram, the 3D modeling program 116 can determine that the edge is a violating edge and can determine at least one triangle among the triangles of the surface mesh that intersects with the edge. If the 3D modeling program 116 determines that each edge of a surface mesh belongs to an edge of the tetrahedrons in the Delaunay diagram, the 3D modeling program 116 can determine that the surface mesh does not have self-intersection. More details of detecting self-intersection in a surface mesh using a Delaunay diagram is described below in connection with FIG. 2.

The 3D modeling program 116 can provide the UI 122 that displays the surface mesh 132 of a 3D model. The 3D modeling program 116 can provide UI 122 that displays a surface mesh and locations where self-intersection is detected in the surface mesh.

In some implementations, the 3D modeling program 116 can cause a refinement of the surface mesh after detecting a self-intersection. In some implementations, the 3D modeling program 116 can provide a UI presenting data identifying the self-intersection on a display device 120 to trigger a user 190 to perform the refinement of the surface mesh. For example, the 3D modeling program 116 can be instructed by a user 190 to remove a self-intersection among the triangles of the surface mesh by generating an updated surface mesh.

As a result, the average mesh size for each updated portion of the updated surface mesh has a value that is smaller than an average mesh size for the portion of the surface mesh before the update. An average mesh size for a surface mesh is defined as the arithmetic average of the side lengths of the triangles in the surface mesh. For example, the 3D modeling program 116 can divide each triangle within a target region into two, four, or six smaller triangles. The 3D modeling program 116 can provide a UI 122 that displays the updated surface-mesh after removing the self-intersection(s). After refinement of the surface mesh, the 3D modeling program 116 can generate a volumetric mesh based on the surface mesh after refinement.

In some implementations, the computer 110 can include a numerical simulation program 102, which implements numerical simulation functions. In some implementations, the 3D modeling program 116 can include the numerical simulation program 102. A numerical simulation generates predicted behavior of an object using a volumetric mesh of a 3D model of an object. For example, Finite Element Analysis (FEA) is one of the numerical simulation techniques to predict the behavior of a three-dimensional (3D) object based on a volumetric mesh of the 3D object. FEA can be used for fluid flow analysis, structural analysis, and electromagnetism analysis.

In some implementations, the 3D modeling program 116 can implement manufacturing control functions. Once the user 190 is satisfied with the 3D model 130, e.g., after removal of self-intersections in a surface mesh and/or generating an updated volumetric mesh for the 3D model 130, the 3D model 130 can be stored as the 3D model document (s) and/or used to generate another representation of the model (e.g., a .STL file for additive manufacturing). This can be done upon request by the user 190, or in light of the user's request for another action, such as sending the 3D model 130 to additive manufacturing (AM) machine(s) and/or subtractive manufacturing (SM) machine(s) 170, molding, or other manufacturing machinery, which can be directly connected to the computer 110, or connected via a network 140, as shown. This can involve a post-process carried out on the local computer 110 or a cloud service to export the 3D model 130 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the 3D modeling program 116 can provide a document 160 (having toolpath specifications of an appropriate format) to an AM and/or SM machine 170 to produce a physical structure corresponding to at least a portion of the 3D model 130. An AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modeling (FDM), which can include metals deposition AM). In some cases, the AM machine 170 builds the physical structure directly, and in some cases, the AM machine 170 builds a mold for use in casting or forging the physical structure. Thus, manufacturing of the part can involve using molding techniques, such as injection molding, overmolding, compression molding, compression-injection molding and insert molding manufacturing processes. In addition, the user 190 can save or transmit the 3D model 130 for later use. For example, the 3D modeling program 116 can store the document(s) 160 that includes the 3D model 130.

An SM machine 170 can be a Computer Numerical Control (CNC) milling machine, such as a multi-axis, multi-tool milling machine used in the manufacturing process. For example, the 3D modeling program 116 can generate CNC instructions for a machine tool system 170 that includes multiple tools (e.g., solid carbide round tools of different sizes and shapes, and insert tools of different sizes that receive metal inserts to create different cutting surfaces) useable for various machining operations. Thus, in some implementations, the 3D modeling program 116 can provide a corresponding document 160 (having toolpath specifications of an appropriate format, e.g., a CNC numerical control (NC) program) to the SM machine 170 for use in manufacturing the physical structure using various cutting tools, etc.

In some implementations, the 3D modeling program 116 can provide instructions to build a workpiece in a first stage of manufacturing, e.g., using direct AM and/or using forging and/or casting methods, and the 3D modeling program 116 also provide instructions to machine the workpiece, e.g., roughing and/or finishing operations, in a second stage of manufacturing, e.g., in a 3-axis CNC milling system, in order to form the completed structure. In general, various different manufacturing systems and techniques can be employed, either alone or in combination, to produce a final structure, and the 3D modeling program 116 can include suitable algorithms to generate toolpath specifications 160 for one or more of these various systems to manufacture a part that has been designed using the systems and techniques described in this application.

In some implementations, no physical manufacturing is involved. The systems and techniques described herein are applicable to any suitable 3D modeling program. In some implementations, an animation designer can use the 3D modeling program 116 to accurately and efficiently design a surface mesh and/or a volumetric mesh of a 3D model for animation. In some implementations, the 3D modeling program 116 can be animation production programs that render the surface mesh 132 and/or a volumetric mesh generated based on the surface mesh 132 to a document of an appropriate format for visual display, such as by a digital projector 174 (e.g., a digital cinema package (DCP) 165 for movie distribution) or other high resolution display device.

In some implementations, the 3D modeling program 116 can be a graphics program that performs numerical simulation, numerical analysis, or rendering using a volumetric mesh and/or a surface mesh. In some implementations, the 3D modeling program 116 can perform collision detection using a surface mesh of a 3D model, a volumetric mesh of a 3D model, or a combination of both. For example, the 3D modeling program 116 can perform collision detection between different objects in a computer game. The 3D modeling program 116 can detect intersection(s) between surface mesh(es) of one or more objects using a Delaunay diagram of the surface mesh(es) in accordance with the systems and techniques described herein.

In some implementations, the 3D modeling program 116 can render a display of a scene based on a surface mesh of the objects in the scene. To save memory and computational resources, e.g., for a large scene, the surface mesh of the objects can have a coarse discretization, which may lead to self-intersections. The 3D modeling program 116 can perform intersection detection using the surface mesh of the objects to find self-intersection(s) of a surface mesh of an object and/or intersection(s) between different objects using the systems and techniques described herein. Other applications are also possible, such as architecture and gaming applications. For example, in order to provide a more realistic user experience in a gaming application, the systems and techniques described herein can be used to remove self-intersections on object surfaces for objects in a scene.

FIG. 2 is a flowchart showing an example of a process 200 to detect self-intersection in a surface mesh of a three-dimensional (3D) model. A surface mesh including vertices and edges that define triangles that approximate a surface of a 3D model of a 3D object is obtained 202, e.g., by the 3D modeling program 116. A boundary of a 3D solid body can be represented as a surface mesh that includes triangles. The union of the triangles in the surface mesh that corresponds to a face of the 3D model can represent a valid manifold that is topologically equivalent to the face, and geometrically approximates the face up to a tolerance.

For example, FIG. 2 shows a 3D model 210 of a 3D object. The 3D model 210 has a half-cylinder shape and has a thin structure. In general, in a thin structure, the ratio of one or more surface dimensions to the thickness dimension (e.g., material thickness) is larger than a threshold, e.g., 5, 10, or 20. For example, the thickness of the half-cylinder (e.g., several millimeters) is much smaller than the diameter and the length (e.g., several centimeters) of the half-cylinder. The surface of the 3D model 210 includes an outside face 210(*a*) and an inside face 210(*b*). The 3D modeling program 116 can obtain a triangular surface mesh 212 including vertices and edges that define triangles that approximate the exact geometry of the surface of the 3D model 210.

In some implementations, the 3D modeling program 116 can generate the surface mesh from the 3D model of the 3D object. In some implementations, the 3D modeling program 116 can receive the surface mesh. For example, the 3D modeling program 116 can read the surface mesh saved in memory 114. As another example, the 3D modeling program 116 can receive the surface mesh from another computer that generates the surface mesh.

In some implementations, a 3D model can include multiple faces and the multiple faces can be approximated with a triangular surface mesh. Usually, triangles on the same face of the 3D model do not intersect with each other. But triangles in one face can intersect with triangles of another face.

For example, 214 and 216 are side views of two faces F1 (corresponding to 210(*a*)) and F2 (corresponding to 210(*b*)) of the 3D model 210. The 3D model 210 has a thin structure defined by the two faces F1 and F2. The surface mesh of the 3D model 210 includes a surface mesh of the face F1 214 and a surface mesh of the face F2 216. The edge 218 is a side view of a triangle included in the surface mesh for the face F1 214. The edge 220 is a side view of a triangle included in the surface mesh for the face F2 216. The surface meshes of F1 and F2 intersect with each other at point P.

Self-intersections can often exist in a surface mesh for a thin structure. Some existing techniques may not be able to efficiently and/or correctly detect self-intersections in the surface mesh of the thin structure, resulting in inefficient and/or incorrect downstream processing. The systems and techniques can solve this problem by efficiently and correctly detecting the self-intersections in a surface mesh of a thin structure using properties of a Delaunay diagram. Thus, compared with some existing techniques, the systems and techniques described herein can result in less computational cost and improve user experience of users who perform the downstream processing, such as a numerical simulation and/or a rendering of a volumetric mesh generated based on the surface mesh.

A Delaunay diagram of the vertices of the surface mesh is obtained 204, e.g., by the 3D modeling program 116. The Delaunay diagram includes a volumetric mesh including tetrahedrons having vertices at the vertices of the surface mesh. In some implementations, the 3D modeling program

116 can generate the Delaunay diagram from the vertices of the surface mesh using Delaunay tetrahedrization algorithm. In some implementations, the 3D modeling program 116 can receive the Delaunay diagram. For example, the 3D modeling program 116 can read the Delaunay diagram saved in memory 114. As another example, the 3D modeling program 116 can receive the Delaunay diagram from another computer that generates the Delaunay diagram. For example, the tetrahedron 222 is one of the tetrahedrons in a Delaunay diagram of the surface meshes of face F1 214 and face F2 216. The tetrahedrons have vertices at the vertices of the surface meshes of face F1 and face F2.

Data indicating at least one intersection among the triangles of the surface mesh is determined 206 using the Delaunay diagram, e.g., by the 3D modeling program 116. For example, the data can include faces of the 3D model whose surface mesh needs to be refined. For example, the 3D modeling program 116 can determine that the surface meshes of faces F1 214 and F2 216 have self-intersection and can determine that at least one of the faces F1 and F2 needs refinement.

In some implementations, for each edge of the edges of the surface mesh, the 3D modeling program 116 can determine whether the edge is not an edge of any of the tetrahedrons in the Delaunay diagram. In response to determining that the edge is not in the Delaunay diagram, e.g., the edge is a violating edge, the 3D modeling program 116 can determine at least one triangle among the triangles of the surface mesh that intersects with the (violating) edge. In some implementations, the surface of the 3D model can include faces, and the data indicating the at least one intersection among the triangles of the surface mesh can include data identifying at least one face of the surface of the three-dimensional model that corresponds to the at least one triangle that intersects with the edge.

For example, the edge 224 can correspond to the edge 220 of the surface mesh for face F2 216. The tetrahedron 222 can be a tetrahedron in the Delaunay diagram of the surface meshes of faces F1 and F2. The tetrahedron 222 has vertices at the vertices of the surface meshes of faces F1 and F2, e.g., vertices of the triangle ABC and a vertex of the edge 224. Here the triangle ABC is included in the surface mesh of the face F1 214. For example, the edge 218 can be an edge of the triangle ABC. The circle 226 represents a circumscribing sphere of the tetrahedron 222.

Because a Delaunay diagram requires that no point is inside the circumscribing sphere of any tetrahedron in the Delaunay diagram, finding an edge that is not an edge of any of the tetrahedrons in the Delaunay diagram indicates that there is self-intersection. Suppose an edge e has vertices $V_1$ and $V_2$ and is not an edge of any of the tetrahedrons in the Delaunay diagram. The vertex $V_1$ is a vertex of a tetrahedron T in the Delaunay diagram. The tetrahedron T is formed by the vertex $V_1$ and a triangle t. Because a Delaunay diagram requires that no point is inside the circumscribing sphere of the tetrahedron T in the Delaunay diagram, the three vertices of the triangle t are all closer to vertex $V_1$ than the vertex $V_2$ of the edge e. Thus, the 3D modeling program 116 can determine that the edge e intersects with the triangle t and/or one or more other triangles that are near the triangle t.

For example, the 3D modeling program 116 can determine that the edge 224 is not an edge of any of the tetrahedrons in the Delaunay diagram. The edge 224 has two vertices $V_1$ and $V_2$. For example, the edge 224 is not an edge of any of the six edges of the tetrahedron 222, and is also not an edge of any of the other tetrahedrons in the Delaunay diagram, if there are any such tetrahedrons. Because a Delaunay diagram requires that no point is inside the circumscribing sphere 226 of the tetrahedron $ABCV_1$ in the Delaunay diagram, the three vertices A, B, and C of the triangle ABC are all closer to vertex $V_1$ than the vertex $V_2$. Thus, the 3D modeling program 116 can determine that the edge 224 intersects with the triangle ABC and/or one or more other triangles that are near the triangle ABC. For example, as shown in FIG. 2, in response to determining that the edge 224 is not an edge of any of the tetrahedrons in the Delaunay diagram, the 3D modeling program 116 can determine that the edge 224 is a violating edge and the triangle ABC intersects with the edge 224. The 3D modeling program 116 can determine data identifying the face F1 214 corresponding to the violated triangle ABC as a face that needs to be refined to avoid self-intersection.

In some implementations, the 3D modeling program 116 can determine a triangular surface of a tetrahedron in a volumetric mesh of the Delaunay diagram that intersects with the edge. For example, the triangular surface ABC that intersects with the violating edge 224 can be a violated triangular face in the Delaunay diagram. The 3D modeling program 116 can determine, from the triangles of the surface mesh, a set of candidate triangles, wherein each candidate triangle shares at least one vertex with the (violated) triangular surface. For example, after determining a violated triangle ABC, the 3D modeling program 116 can determine a set of candidate triangles that are in the vicinity of the violated triangle ABC. The 3D modeling program 116 can identify the vertices A, B, C of the violated triangle ABC, and can identify triangles in the surface mesh that shares at least one of the vertices A, B, C with the violated triangle ABC. The 3D modeling program 116 can determine, from the set of candidate triangles, the at least one triangle that intersects with the edge.

A refinement of the surface mesh based on the data indicating the at least one intersection is caused 208, e.g., by the 3D modeling program 116, and the refinement removes the at least one intersection among the triangles of the surface mesh. In some implementations, the 3D modeling program 116 can remove the at least one intersection among the triangles of the surface mesh by generating an updated surface mesh. In some implementations, the 3D modeling program 116 can generate, a respective updated portion of the updated surface mesh for each face of the surface of the three-dimensional model where the at least one intersection among the triangles of the surface mesh is located such that an average mesh size for each updated portion of the updated surface mesh can be smaller than an average mesh size for the portion of the surface mesh before the update.

For example, the 3D modeling program 116 can generate an updated surface mesh for face F1 214. A side view of the updated surface mesh includes an edge 230 of a first triangle in the updated surface mesh and an edge 232 of a second triangle in the updated surface mesh. The lengths of the edges 230 and 232 of the triangles in the updated surface mesh are both smaller than the length of the edge 218 of the triangle in the original surface mesh. The surface meshes of the faces F1 and F2 no longer have self-intersection.

In some implementations, instead of based on the "average mesh size", the 3D modeling program 116 can use other suitable measurements to generate the updated surface mesh. For example, the 3D modeling program 116 can generate, a respective updated portion of the updated surface mesh for each face of the surface of the three-dimensional model where the at least one intersection among the triangles of the surface mesh is located such that a smallest nearby feature for each updated portion of the updated surface mesh can be smaller than a smallest nearby feature for the portion of the surface mesh before the update. In some implementations, generation of the updated surface mesh based on "the smallest nearby feature" can lead to a finer final surface mesh. In some implementations, in order to capture details of an object, the 3D modeling program 116 may use a smaller mesh size for the updated surface mesh for some parts of an object than the mesh size for other parts of the object. For example, an oil hole on an automotive connecting rod can have a smaller diameter compared to the diameters of other parts of the connecting rod. Thus, for the updated surface mesh for the oil hole, the 3D modeling program 116 can use a much smaller surface mesh size than the average mesh size for the connecting rod.

In some implementations, the 3D modeling program 116 can iteratively generate the refinement of the surface mesh. FIG. 3 is a flowchart showing an example of a process 300 to iteratively detect self-intersection in a surface mesh of a three-dimensional model and iteratively refine the surface mesh using an iterative algorithm. For each iteration, the 3D modeling program 116 can perform the operations 302, 304, 306, 308, 309A, 309B, and 310.

In some implementations, the 3D modeling program 116 can obtain 302 an initial surface mesh at a current iteration, and the initial surface mesh at the current iteration can be an updated surface mesh generated in a previous iteration. The initial surface mesh at the first iteration can be the input surface mesh of the 3D model of the 3D object. At each iteration, for example, the initial surface mesh at the current iteration can include a set of vertices V, edges E, and faces F.

In some implementations, the 3D modeling program 116 can generate 304 a Delaunay diagram at the current iteration from vertices of the initial surface mesh using Delaunay tetrahedrization algorithm. For example, the 3D modeling program 116 can compute a Delaunay diagram D(V) of the vertices V.

In some implementations, for each edge (e.g., of a triangle) of the edges of the initial surface mesh, the 3D modeling program 116 can determine 306 whether the edge is not an edge of any of the tetrahedrons in the Delaunay diagram at the current iteration. For example, the 3D modeling program 116 can, for each edge e in the surface mesh, try to find the edge e in the Delaunay diagram D(V). This operation can be done in constant time, meaning that the time the 3D modeling program 116 takes to compute the result is independent of the number of tetrahedrons in the Delaunay diagram. For example, the 3D modeling program 116 can cache the vertices of an initial surface mesh in a Delaunay diagram. To find an edge e which goes from vertex A to vertex B, the 3D modeling program 116 can look up vertex A in one operation. The maximum number of tetrahedra incident to vertex A is bounded by a constant K, which is related to the mesh size of the initial surface mesh, Therefore, the 3D modeling program 116 can determine the tetrahdeon that contains the edge e in at most K operations. If the edge e is already part of the Delaunay diagram, the 3D modeling program 116 can cache the containing tetrahedron for instant access, downstream.

If the 3D modeling program 116 determines 306 that the edge is in the Delaunay diagram at the current iteration, the 3D modeling program 116 can determine 309A whether all edges of the initial surface mesh have been checked through the operation in 306. If there are more edges that need to be checked, the 3D modeling program 116 determines 306 whether the next edge is in the Delaunay diagram at the current iteration. If all the edges have been checked through the operation in 306, the 3D modeling program 116 performs the operations in 309B and 310, which will be discussed later.

In response to determining 306 that the edge is not in the Delaunay diagram at the current iteration, in some implementations, the 3D modeling program 116 can generate 308 data identifying at least one face of the surface of the three-dimensional model that needs the refinement, and in some cases, the 3D modeling program 116 can add 308 the data identifying the at least one face to a refinement set of faces that need refinement. FIG. 4 is a flowchart showing an example of a process 400 to generate data identifying a face of a three-dimensional model that has self-intersection. The process 400 can be performed for each edge that has been determined to be not in the Delaunay diagram.

In some implementations, the 3D modeling program 116 can determine 402 a triangular surface of a tetrahedron in the volumetric mesh of Delaunay diagram at the current iteration that intersects with the edge. For example, if the edge e (e.g., a violating edge) is not present in the Delaunay diagram D(V), the 3D modeling program 116 can determine the triangular face T in the Delaunay diagram that is obstructing it. For example, as shown in FIG. 2, the 3D modeling program 116 can determine the triangular surface ABC in the Delaunay diagram that is obstructing the violating edge 224. This operation can be done in constant time. For example, the 3D modeling program 116 can cache the vertices of the initial surface mesh in the Delaunay diagram. To find an edge e which goes from vertex A to vertex B, vertex A can be looked up in one operation. The maximum number of tetrahedra incident to vertex A is bounded by a constant K, which is related to the mesh size of the initial surface mesh. Therefore, the 3D modeling program 116 can determine the tetrahderal face T that violates the edge e in at most K operations.

In some implementations, the 3D modeling program 116 can determine 404, from the triangles of the initial surface mesh, a set of candidate triangles, wherein each candidate triangle shares at least one vertex with the triangular surface that intersects with the violating edge. For example, the 3D modeling program 116 can collect the set of surface mesh triangles S that are in the vicinity of the triangle T. The number of the elements in the set S can be smaller than a threshold, e.g., smaller than 100 or less, thus ensuring the efficiency of the self-intersection detection.

In some implementations, the 3D modeling program 116 can identify 406, from the set of candidate triangles, one or more candidate triangles that intersect with the edge. For example, for each triangle t in the set S, the 3D modeling program 116 can determine whether the edge e intersects with the triangle t.

In some implementations, the 3D modeling program 116 can identify 408 the at least one face of the surface of the three-dimensional model that corresponds to the one or more candidate triangles that intersect with the edge. In some implementations, the 3D modeling program 116 can add 410 data identifying the at least one face to a refinement set of faces including one or more faces that need the refinement. For example, for each triangle t in the set S, if the edge e intersects with the triangle t, the 3D modeling program 116 can add the parent face F of the triangle t to the refinement set R. The refinement set R includes one or more faces whose surface mesh needs a refinement.

Referring back to FIG. 3, after generating 308 data identifying at least one face that needs the refinement, the 3D modeling program 116 continue to determine 306 whether the next edge of the initial surface mesh is not an edge of any of the tetrahedrons in the Delaunay diagram at the current iteration, until all edges of the initial surface mesh is checked. After determining 309A that all edges of the initial surface mesh have been checked through the operation in 306, the 3D modeling program 116 can determine 309B whether the refinement set is empty, e.g., not including at least one or two faces that need refinement.

In some implementations, in response to determining that the refinement set is not empty, the 3D modeling program 116 can generate 310 an updated surface mesh for the iteration for each face in the refinement set of faces, and an average mesh size for the updated surface mesh can be smaller than an average mesh size for the surface mesh before update. FIG. 5 is a flowchart showing an example of a process 500 to remove self-intersection for a face of a three-dimensional model.

In some implementations, the 3D modeling program 116 can compute 502 an average mesh size for each of two or more faces in the refinement set of faces. For example, for each face F in the refinement set R, the 3D modeling program 116 can compute the average mesh size of the face F. In some implementations, the 3D modeling program 116 can compute 504, using the average mesh sizes, a minimum average mesh size among the two or more faces in the refinement set of faces. For example, the 3D modeling program 116 can compute the minimum average mesh size h among all faces in the set R.

In some implementations, the 3D modeling program 116 can determine 506, using the minimum average mesh size, a new average mesh size for the two or more faces in the refinement set of faces. For example, the 3D modeling program 116 can compute a new average mesh size h' for the set R. For example, the new average mesh size h' can be ½, ¼, or a square root of the old average mesh size h. In some implementations, the new average mesh size for the faces in the refinement set can have the same size or can have different sizes.

In some implementations, the 3D modeling program 116 can generate 508, for each face in the two or more faces in the refinement set of faces, the updated surface mesh for the iteration, wherein the average mesh size for the updated surface mesh equals to the new average mesh size. For example, for each face F in the refinement set R, the 3D modeling program 116 can refine the surface mesh for the face F to the new average mesh size h'.

Referring back to FIG. 3, in response to determining 309B that the refinement set is empty, the 3D modeling program can determine that this is the end of the iterative algorithm. That is, in response to determining (306, 309A, and 309B) that each edge of a current initial surface mesh is an edge of a tetrahedron in the Delaunay diagram at the current iteration, the 3D modeling program 116 can determine that the current initial surface mesh is a final updated surface mesh and can exit the iterative algorithm. For example, in response to determining that there are no violating edges, the 3D modeling program 116 can exit the iterative algorithm. The iterative algorithm in the process 300 is guaranteed to terminate. This is because the 3D model has a fixed local thickness, and the refined surface mesh size will eventually have an average mesh size that is smaller than the fixed local thickness of the 3D model.

In some implementations, the 3D modeling program 116 can generate 312 an updated volumetric mesh of the three-dimensional model of the three-dimensional object using an updated surface mesh after the refinement. In some implementations, after exiting the iterative algorithm, the 3D modeling program 116 can generate 312 an updated volumetric mesh of the three-dimensional model of the three-dimensional object using the updated surface mesh at the last iteration. For example, the updated volumetric mesh can be used for numerical simulations, e.g., FEA, volumetric rendering in animation production programs, or other suitable applications that use volumetric mesh.

In some implementations, the 3D modeling program 116 does not generate an updated volumetric mesh using the updated surface mesh. For example, the 3D modeling program 116 can perform collision detection using the iterative process (e.g., operations 302, 304, 306, 308, 309A, 309B, 310) in FIG. 3, without performing the operations in 312. As another example, 3D modeling program 116 can perform intersection detection for a surface mesh of a large scene using the iterative process (e.g., operations 302, 304, 306, 308, 309A, 309B, 310) in FIG. 3, without performing the operations in 312.

In some implementations, the 3D modeling program 116 can generate an updated Delaunay diagram from vertices of the updated surface mesh using Delaunay tetrahedrization algorithm, and the updated Delaunay diagram includes the updated volumetric mesh. Because during the last iteration of the iterative algorithm, the 3D modeling program 116 already generated a Delaunay diagram of the updated surface mesh at the last iteration, e.g., in step 304 of FIG. 3, no additional computation is needed to generate the updated volumetric mesh using the Delaunay tetrahedrization algorithm. In some implementations, instead of using a Delaunay tetrahedrization based approach, the 3D modeling program 116 can generate an updated volumetric mesh from the updated surface mesh using other methods. For example, the 3D modeling program 116 can generate an updated volumetric mesh using an Octree-based approach.

In some implementations, the 3D modeling program 116 can provide the updated volumetric mesh of the three-dimensional model for numerical simulation of the three-dimensional object. In some implementations, the 3D model is being designed for manufacturing, and after the numerical simulation using the updated volumetric mesh of the 3D model, the 3D object can be manufactured based on the result of the numerical simulation. For example, numerical simulation and/or numerical analysis can be performed using the updated volumetric mesh in an iterative loop that modifies the shape (and optionally the topology) of the three-dimensional model, which represents a physical structure, in response to results of the numerical simulation and/or numerical analysis, and the 3D modeling program 116 can then use the modified three-dimensional model to generate one or more toolpath specifications for one or more computer-controlled manufacturing systems, and the one or more toolpath specifications can be used by the one or more computer-controlled manufacturing systems to manufacture the physical structure.

In some implementations, the 3D modeling program 116 can render the updated surface mesh and/or an updated volumetric mesh of the three-dimensional model of the three-dimensional object generated using the updated surface mesh to an animation document for a digital projector. For example, the 3D modeling program 116 can render at least a portion of surface mesh and/or the volumetric mesh to an animation document, e.g., DCP 165, for the digital projector, e.g., digital projector 174, and the animation document can then be presented on a display device, e.g., presented in a theater using the digital projector 174.

The self-intersection detection techniques described herein can be orders of magnitude smaller than the time required to generate a volumetric mesh of a 3D model. For example, when testing on a wide array of nearly 8000 3D models, the runtime of the self-intersection detection described herein can range from 7 microseconds to 1.8 seconds with an average of less than $\frac{1}{10}$ of a second. The typical runtime required to generate a volumetric mesh can be in the order of seconds or minutes. Thus, the self-intersection techniques described herein can provide at least 10 times runtime improvement of the overall volumetric meshing process. Thus, compared with traditional self-intersection detection techniques, the techniques described herein can efficiently detect self-intersections in surface mesh and can speed up the overall simulation runtime.

Figure 6:
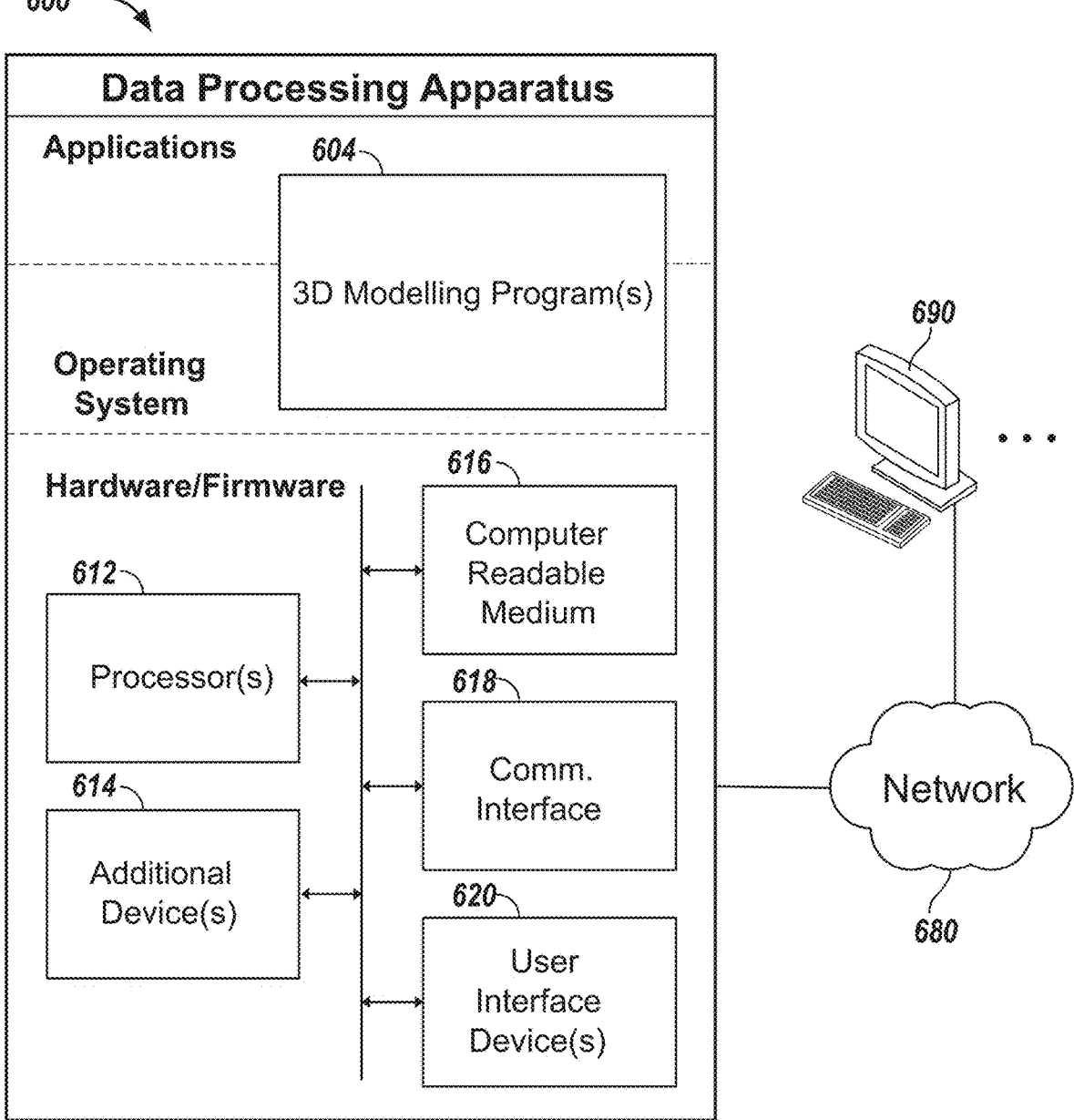
FIG. 6 is a schematic diagram of a data processing system including a data processing apparatus, which can be programmed as a client or as a server.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an application layer and an operating system. These can include executable and/or interpretable software programs or libraries, including tools and services of one or more 3D modeling program(s) 604 that implement the systems and techniques described herein. Thus, the 3D modeling program(s) 604 can be CAD program(s) that implements 3D modeling functions and self-intersection detection algorithms for a 3D surface mesh.

Further, the 3D modeling program(s) 604 can implement simulation operations (finite element analysis (FEA) or other), generative design operations (e.g., using level-set based method(s) for generative design), and/or manufacturing control operations (e.g., generating and/or applying toolpath specifications to effect manufacturing of designed objects), and/or movie animation production. The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses the communication interface 618 to communicate with one or more computers 690, for example, over the network 680. Examples of user interface devices 620 include a display, a camera, a speaker, a microphone, a tactile feedback device, a keyboard, a mouse, and VR and/or AR equipment. The data processing apparatus 600 can store instructions that implement operations associated with the program(s) described above, for example, on the computer readable medium 616 or one or more additional devices 614, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
obtaining, by a three-dimensional modeling program, (i) a surface mesh comprising vertices and edges that define triangles that approximate a surface of a three-dimensional model of a three-dimensional object, and (ii) a Delaunay diagram of the vertices of the surface mesh, wherein the Delaunay diagram comprises a volumetric mesh comprising tetrahedrons having vertices at the vertices of the surface mesh;
determining, by the three-dimensional modeling program and using the Delaunay diagram, data indicating at least one intersection among the triangles of the surface mesh;
causing a refinement of the surface mesh based on the data indicating the at least one intersection, wherein the refinement removes the at least one intersection among the triangles of the surface mesh; and
rendering, on a display device, an updated surface mesh generated by the refinement;
wherein determining, using the Delaunay diagram, the data indicating the at least one intersection among the triangles of the surface mesh comprises:
for each edge of the edges of the surface mesh, determining whether the edge is not an edge of any of the tetrahedrons in the Delaunay diagram; and
in response to determining that the edge is not in the Delaunay diagram, determining at least one triangle among the triangles of the surface mesh that intersects with the edge.

2. The method of claim 1, wherein the obtaining comprises generating the surface mesh from the three-dimensional model of the three-dimensional object.

3. The method of claim 1, wherein the obtaining comprises generating the Delaunay diagram from the vertices of the surface mesh using Delaunay tetrahedrization algorithm.

4. The method of claim 1, wherein the surface of the three-dimensional model comprises faces, wherein the data indicating the at least one intersection among the triangles of the surface mesh comprises data identifying at least one face of the surface of the three-dimensional model that corresponds to the at least one triangle that intersects with the edge.

5. The method of claim 1, wherein determining the at least one triangle among the triangles of the surface mesh that intersects with the edge comprises:

determining a triangular surface of a tetrahedron in the volumetric mesh of the Delaunay diagram that intersects with the edge;
determining, from the triangles of the surface mesh, a set of candidate triangles, wherein each candidate triangle shares at least one vertex with the triangular surface; and
determining, from the set of candidate triangles, the at least one triangle that intersects with the edge.

6. The method of claim 1, wherein the causing comprises:
removing the at least one intersection among the triangles of the surface mesh by generating the updated surface mesh, comprising:
generating, a respective updated portion of the updated surface mesh for each face of the surface of the three-dimensional model where the at least one intersection among the triangles of the surface mesh is located, wherein an average mesh size for each updated portion of the updated surface mesh is smaller than an average mesh size for the portion of the surface mesh before the update.

7. The method of claim 6, further comprising:
generating an updated volumetric mesh of the three-dimensional model of the three-dimensional object using the updated surface mesh.

8. The method of claim 7, further comprising:
providing the updated volumetric mesh of the three-dimensional model for numerical simulation of the three-dimensional object.

9. The method of claim 7, wherein generating the updated volumetric mesh comprises generating an updated Delaunay diagram from vertices of the updated surface mesh using Delaunay tetrahedrization algorithm, wherein the updated Delaunay diagram comprises the updated volumetric mesh.

10. The method of claim 6, further comprising:
rendering the updated surface mesh and/or an updated volumetric mesh of the three-dimensional model of the three-dimensional object generated using the updated surface mesh to an animation document for a digital projector.

11. The method of claim 1, comprising iteratively generating the refinement of the surface mesh, wherein the iteratively generating comprises, for each iteration:
obtaining an initial surface mesh at a current iteration, wherein the initial surface mesh at the current iteration is an updated surface mesh generated in a previous iteration;
generating a Delaunay diagram at the current iteration from vertices of the initial surface mesh using Delaunay tetrahedrization algorithm;
for each edge of the edges of the initial surface mesh, determining whether the edge is not an edge of any of the tetrahedrons in the Delaunay diagram at the current iteration;
in response to determining that the edge is not in the Delaunay diagram at the current iteration, generating data identifying at least one face of the surface of the three-dimensional model that needs the refinement, wherein the generating comprises:
determining a triangular surface of a tetrahedron in the volumetric mesh of Delaunay diagram at the current iteration that intersects with the edge;
determining, from the triangles of the initial surface mesh, a set of candidate triangles, wherein each candidate triangle shares at least one vertex with the triangular surface;

identifying, from the set of candidate triangles, one or more candidate triangles that intersect with the edge;

identifying the at least one face of the surface of the three-dimensional model that corresponds to the one or more candidate triangles that intersect with the edge; and adding data identifying the at least one face to a refinement set of faces comprising one or more faces that need the refinement; and generating an updated surface mesh for the iteration for each face in the refinement set of faces, wherein an average mesh size for the updated surface mesh is smaller than an average mesh size for the surface mesh before update.

12. The method of claim 11, wherein the iteratively generating comprises, for a last iteration:

for each edge of edges of a second initial surface mesh at a current iteration, determining whether the edge is not an edge of any of the tetrahedrons in a Delaunay diagram at the current iteration; and in response to determining that each edge of the second initial surface mesh is an edge of a tetrahedron in the Delaunay diagram at the current iteration, determining that the second initial surface mesh is a final updated surface mesh.

13. The method of claim 11, wherein generating the updated surface mesh for the iteration for each face in the refinement set of faces comprises:

computing an average mesh size for each of two or more faces in the refinement set of faces;

computing, using the average mesh sizes, a minimum average mesh size among the two or more faces in the refinement set of faces;

determining, using the minimum average mesh size, a new average mesh size for the two or more faces in the refinement set of faces; and generating, for each face in the two or more faces in the refinement set of faces, the updated surface mesh for the iteration, wherein the average mesh size for the updated surface mesh equals to the new average mesh size.

14. A system comprising:

a non-transitory storage medium having instructions of a three-dimensional modeling program stored thereon; and one or more data processors configured to run the instructions of the three-dimensional modeling program to perform operations specified by the instructions of the three-dimensional modeling program;

wherein the operations comprise:

obtaining (i) a surface mesh comprising vertices and edges that define triangles that approximate a surface of a three-dimensional model of a three-dimensional object, and (ii) a Delaunay diagram of the vertices of the surface mesh, wherein the Delaunay diagram comprises a volumetric mesh comprising tetrahedrons having vertices at the vertices of the surface mesh;

determining, using the Delaunay diagram, data indicating at least one intersection among the triangles of the surface mesh;

causing a refinement of the surface mesh based on the data indicating the at least one intersection, wherein the refinement removes the at least one intersection among the triangles of the surface mesh; and rendering, on a display device, an updated surface mesh generated by the refinement;

wherein determining, using the Delaunay diagram, the data indicating the at least one intersection among the triangles of the surface mesh comprises:

for each edge of the edges of the surface mesh, determining whether the edge is not an edge of any of the tetrahedrons in the Delaunay diagram; and in response to determining that the edge is not in the Delaunay diagram, determining at least one triangle among the triangles of the surface mesh that intersects with the edge.

15. The system of claim 14, wherein the obtaining comprises generating the surface mesh from the three-dimensional model of the three-dimensional object.

16. The system of claim 14, wherein the obtaining comprises generating the Delaunay diagram from the vertices of the surface mesh using Delaunay tetrahedrization algorithm.

17. The system of claim 14, wherein the surface of the three-dimensional model comprises faces, wherein the data indicating the at least one intersection among the triangles of the surface mesh comprises data identifying at least one face of the surface of the three-dimensional model that corresponds to the at least one triangle that intersects with the edge.

18. The system of claim 14, wherein determining the at least one triangle among the triangles of the surface mesh that intersects with the edge comprises:

determining a triangular surface of a tetrahedron in the volumetric mesh of the Delaunay diagram that intersects with the edge;

determining, from the triangles of the surface mesh, a set of candidate triangles, wherein each candidate triangle shares at least one vertex with the triangular surface; and determining, from the set of candidate triangles, the at least one triangle that intersects with the edge.

19. The system of claim 14, wherein the causing comprises:

removing the at least one intersection among the triangles of the surface mesh by generating the updated surface mesh, comprising:

generating, a respective updated portion of the updated surface mesh for each face of the surface of the three-dimensional model where the at least one intersection among the triangles of the surface mesh is located, wherein an average mesh size for each updated portion of the updated surface mesh is smaller than an average mesh size for the portion of the surface mesh before the update.

20. A non-transitory computer-readable medium encoding instructions operable to cause data processing apparatus to perform operations comprising:

obtaining (i) a surface mesh comprising vertices and edges that define triangles that approximate a surface of a three-dimensional model of a three-dimensional object, and (ii) a Delaunay diagram of the vertices of the surface mesh, wherein the Delaunay diagram comprises a volumetric mesh comprising tetrahedrons having vertices at the vertices of the surface mesh;

determining, using the Delaunay diagram, data indicating at least one intersection among the triangles of the surface mesh;

causing a refinement of the surface mesh based on the data indicating the at least one intersection, wherein the refinement removes the at least one intersection among the triangles of the surface mesh; and rendering, on a display device, an updated surface mesh generated by the refinement;

wherein determining, using the Delaunay diagram, the data indicating the at least one intersection among the triangles of the surface mesh comprises:

for each edge of the edges of the surface mesh, determining whether the edge is not an edge of any of the tetrahedrons in the Delaunay diagram; and in response to determining that the edge is not in the Delaunay diagram, determining at least one triangle among the triangles of the surface mesh that intersects with the edge.

\* \* \* \* \*